(12) United States Patent
Horikawa et al.

(10) Patent No.: US 11,351,857 B2
(45) Date of Patent: Jun. 7, 2022

(54) SLEEVE MEMBER FOR FILLER PIPE AND FUEL SUPPLY PORTION FORMING DEVICE

(71) Applicant: NIFCO INC., Yokosuka (JP)

(72) Inventors: Jumpei Horikawa, Yokosuka (JP); Yasuhiro Watanabe, Yokosuka (JP)

(73) Assignee: NIFCO INC., Yokosuka (JP)

( * ) Notice: Subject to any disclaimer, the term of this patent is extended or adjusted under 35 U.S.C. 154(b) by 486 days.

(21) Appl. No.: 16/483,271

(22) PCT Filed: Feb. 13, 2018

(86) PCT No.: PCT/JP2018/004848
§ 371 (c)(1),
(2) Date: Aug. 2, 2019

(87) PCT Pub. No.: WO2018/151082
PCT Pub. Date: Aug. 23, 2018

(65) Prior Publication Data
US 2020/0001705 A1    Jan. 2, 2020

(30) Foreign Application Priority Data
Feb. 15, 2017   (JP) .............................. JP2017-025736

(51) Int. Cl.
*B60K 15/04* (2006.01)
*F16L 5/10* (2006.01)
*B60K 15/05* (2006.01)

(52) U.S. Cl.
CPC ............... *B60K 15/04* (2013.01); *F16L 5/10* (2013.01); *B60K 15/05* (2013.01); *B60K 2015/0474* (2013.01)

(58) Field of Classification Search
CPC .......... B60K 15/04; B60K 2015/03315; B60K 15/05; B60K 2015/0474
See application file for complete search history.

(56) References Cited

U.S. PATENT DOCUMENTS

| 9,039,063 B2 * | 5/2015 | Jakobs ............. B60K 15/03177 |
| | | 296/97.22 |
| 10,343,517 B2 | 7/2019 | Matsuura et al. |

(Continued)

FOREIGN PATENT DOCUMENTS

| CN | 102859209 A | 1/2013 |
| JP | H02-142320 U | 12/1990 |

(Continued)

OTHER PUBLICATIONS

PCT/ISA/210, "International Search Report for International Application No. PCT/JP2018/004848," dated Apr. 17, 2018.

(Continued)

*Primary Examiner* — Timothy P. Kelly
(74) *Attorney, Agent, or Firm* — Manabu Kanesaka (57) ABSTRACT

In a sleeve member for a filler pipe, the filler pipe passes through the sleeve member internally and is positioned with an upper end thereof on a fuel supply portion formed on an outside panel forming an outside of an automobile through a through hole formed in an inside panel forming a wheel house of the automobile. The sleeve member includes an attachment portion relative to the outside panel; a main seal portion elastically deformed and pressed against an inner face facing a space formed between the inside panel and the outside panel in such a way so as to surround the through hole by an insertion into the through hole; and an engagement portion which becomes engageable with a hole edge portion of the through hole positioned on an outer-face side of the inside panel by the insertion into the through hole.

9 Claims, 12 Drawing Sheets

(56) References Cited

U.S. PATENT DOCUMENTS

| | | | |
|---|---|---|---|
| 2007/0145056 A1 | 6/2007 | Enomoto et al. | |
| 2013/0206757 A1* | 8/2013 | Nagai | B60K 15/0406 220/86.2 |
| 2013/0249235 A1* | 9/2013 | Lorenc | B60K 15/05 296/97.22 |

FOREIGN PATENT DOCUMENTS

| | | |
|---|---|---|
| JP | 2005-335565 A | 12/2005 |
| JP | 2007-084043 A | 4/2007 |
| JP | 2007-239820 A | 9/2007 |
| JP | 2009-286251 A | 12/2009 |
| JP | WO2012/049956 A1 | 2/2014 |
| JP | 2015-044438 A | 3/2015 |

OTHER PUBLICATIONS

China National Intellectual Property Administration, "Office Action for Chinese Patent Application 201880011126.5," dated Dec. 24, 2021.
China National Intellectual Property Administration, "Search Report for Chinese Patent Application 201880011126.5," dated Dec. 16, 2021.

\* cited by examiner

SLEEVE MEMBER FOR FILLER PIPE AND FUEL SUPPLY PORTION FORMING DEVICE

FIELD OF TECHNOLOGY

The present invention relates to a sleeve member for a filler pipe, and a fuel supply portion forming device including the sleeve member for the filler pipe.

BACKGROUND ART

There is a device comprising a holding portion which is a cylindrical elastic seal member in which an inlet filler pipe passes through, and which engages on an outer-face side (a side facing an inside of a wheel house) of a wheel house outer side relative to a hole edge portion in a through hole formed in the wheel house outer side (see Patent Document 1).

The device of the Patent Document 1 has a structure of sealing by a lip formed in the holding portion on the outer-face side of the wheel house outer side (see paragraph [0038] in the Patent Document 1).

The device of the Patent Document 1 has a sealing property for a space between the wheel house outer side and a side member outer side by the lip, so that in case of carrying out high-pressure cleaning inside the wheel house, and the like, under a circumstance such that an external force acts on the lip, the device of the Patent Document 1 does not have a structure that can reliably prevent an entry of cleaning water and the like into the space.

PRIOR ART DOCUMENT

Patent Document

Patent Document 1: Japanese Patent Application Publication No. 2009-286251

SUMMARY OF THE INVENTION

Problems to be Solved by the Invention

A main object of the present invention is to rationally improve a relevant sealing property of the sleeve member sealing a circumference of the filler pipe in which this type of a filler pipe passes through, in a manner unaffected by a dimensional tolerance of an attachment portion thereof.

Means for Solving the Problems

In order to obtain the aforementioned object, in the present invention, in a first aspect, a sleeve member for a filler pipe, wherein the filler pipe passes through the sleeve member internally and is positioned with an upper end thereof on a fuel supply portion formed on an outside panel forming an outside of an automobile through a through hole formed in an inside panel forming a wheel house of the automobile, comprises an attachment portion relative to the outside panel; a main seal portion elastically deformed and pressed against an inner face facing a space formed between the inside panel and the outside panel in such a way so as to surround the through hole by an insertion into the through hole; and an engagement portion which becomes engageable with a hole edge portion of the through hole positioned on an outer-face side of the inside panel by the insertion into the through hole.

When the sleeve member is inserted into the through hole, the sleeve member is integrated with the inside panel by the engagement portion, and the sleeve member is integrated with the outside panel by the attachment portion, and inside the space, a wheel-house side and an inside of the space are sealed fluid-tightly by the main seal portion. Thereby, in case of carrying out high-pressure cleaning inside a wheel house, or even in a case wherein an external force acts on the engagement portion by water splashed by a tire and the like, cleaning water and the like cannot enter into the space. A tolerance of a distance between the outside panel and the inside panel is absorbed by the elastic deformation of the main seal portion.

One of the aspects of the present invention is that in a portion adjacent to the main seal portion, there is provided a stopper portion abutting against an inner face of the inside panel, and suppressing the elastic deformation exceeding a predetermined deformation amount of the main seal portion.

Also, one of the aspects of the present invention is that an elastically deformable portion is formed between the attachment portion and the main seal portion.

Also, one of the aspects of the present invention is that a cover portion projecting to the filler-pipe side is provided on an inside of the sleeve member.

Also, one of the aspects of the present invention is that the cover portion is formed at a portion located between the main seal portion and the attachment portion.

Also, one of the aspects of the present invention is that the engagement portion is elastically deformed and pressed against the hole edge portion of the through hole in such a way so as to surround the through hole.

Also, one of the aspects of the present invention is that the main seal portion is formed in such a way so as to have a skirt shape wherein a pressing side relative to the inner face of the inside panel is a bottom side.

Also, one of the aspects of the present invention is that in the stopper portion, there is formed a lip portion elastically deformed and pressed against the inner face of the inside panel in such a way so as to surround the through hole.

Also, one of the aspects of the present invention is that the stopper portion is positioned on the through-hole side more than the main seal portion.

Also, in order to obtain the aforementioned object, in the present invention, in a second aspect, a fuel supply portion forming device comprises a main member portion shaping a concave portion forming the fuel supply portion; and a lid opening and closing an entrance of the concave portion, and the main member portion comprises the sleeve member for the filler pipe as the attachment portion of the sleeve member for the filler pipe.

Effect of the Invention

According to the present invention, a relevant sealing property of the sleeve member sealing a circumference of the filler pipe by internally passing the filler pipe therethrough can be rationally improved in the aspects unaffected by a dimensional tolerance between the outside panel and the inside panel.

BEST MODES OF CARRYING OUT THE INVENTION

Hereinafter, with reference to FIG. 1 to FIG. 12, several typical embodiments of the present invention will be explained. A filler-pipe sleeve member 1 according to the present embodiment is provided in an automobile in such a way so as to make a filler pipe 7 to pass internally, wherein an upper end 7a of the filler pipe is positioned in a fuel supply portion 6 formed in an outside panel 5 forming an exterior of the automobile through a through hole 4 formed in an inside panel 3 forming a wheel house 2 of the automobile, and has a function of sealing between the passing filler pipe 7 and the through hole 4. Also, a fuel supply portion forming device 8 according to the present embodiments is formed to include the filler-pipe sleeve member 1, is provided in the automobile, and is combined with the filler pipe 7 so as to form the fuel supply portion 6 of the automobile.

Figure 1:
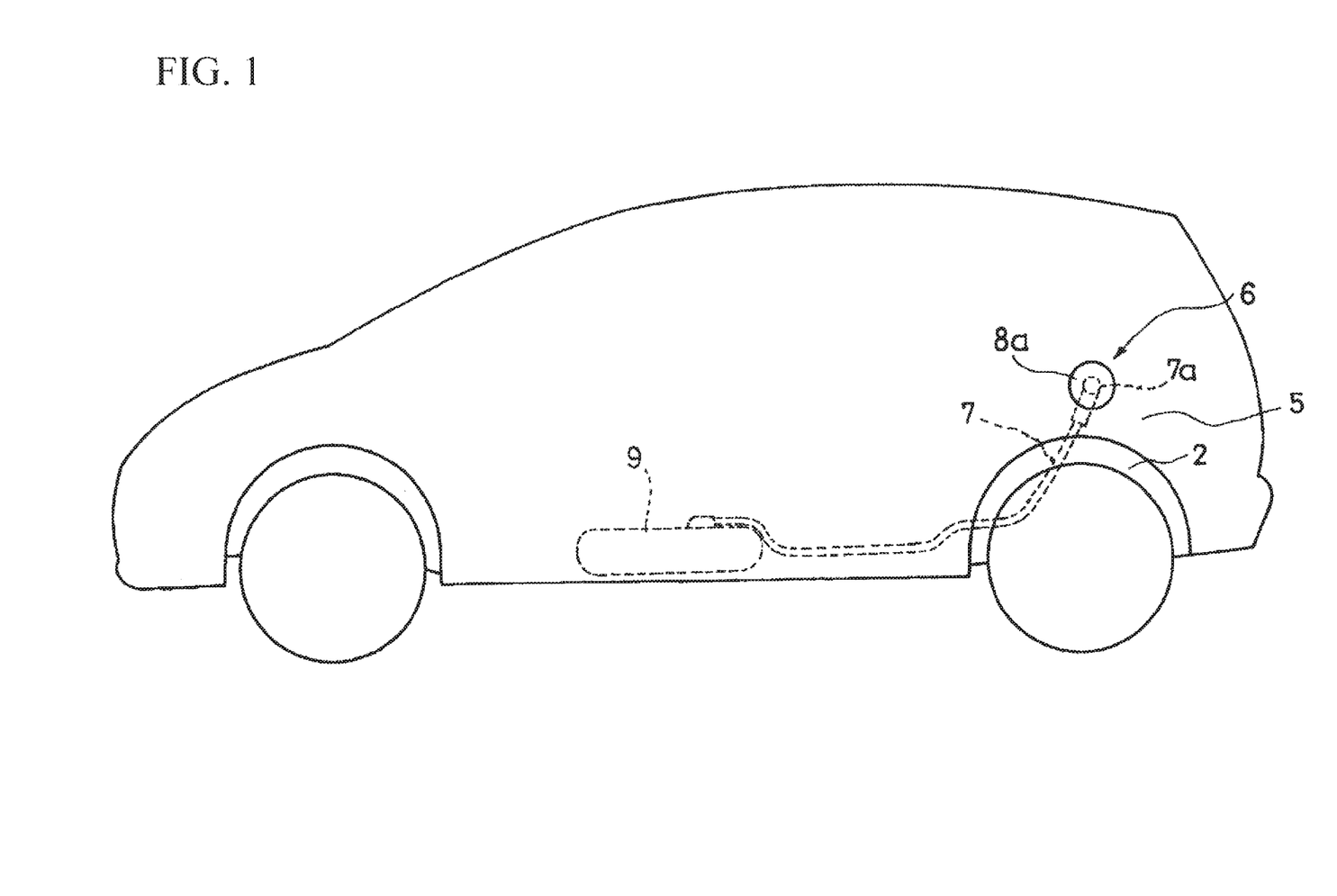
FIG. 1 is a structural view showing one example of an installation state of a fuel supply portion of an automobile.
Figure 2:
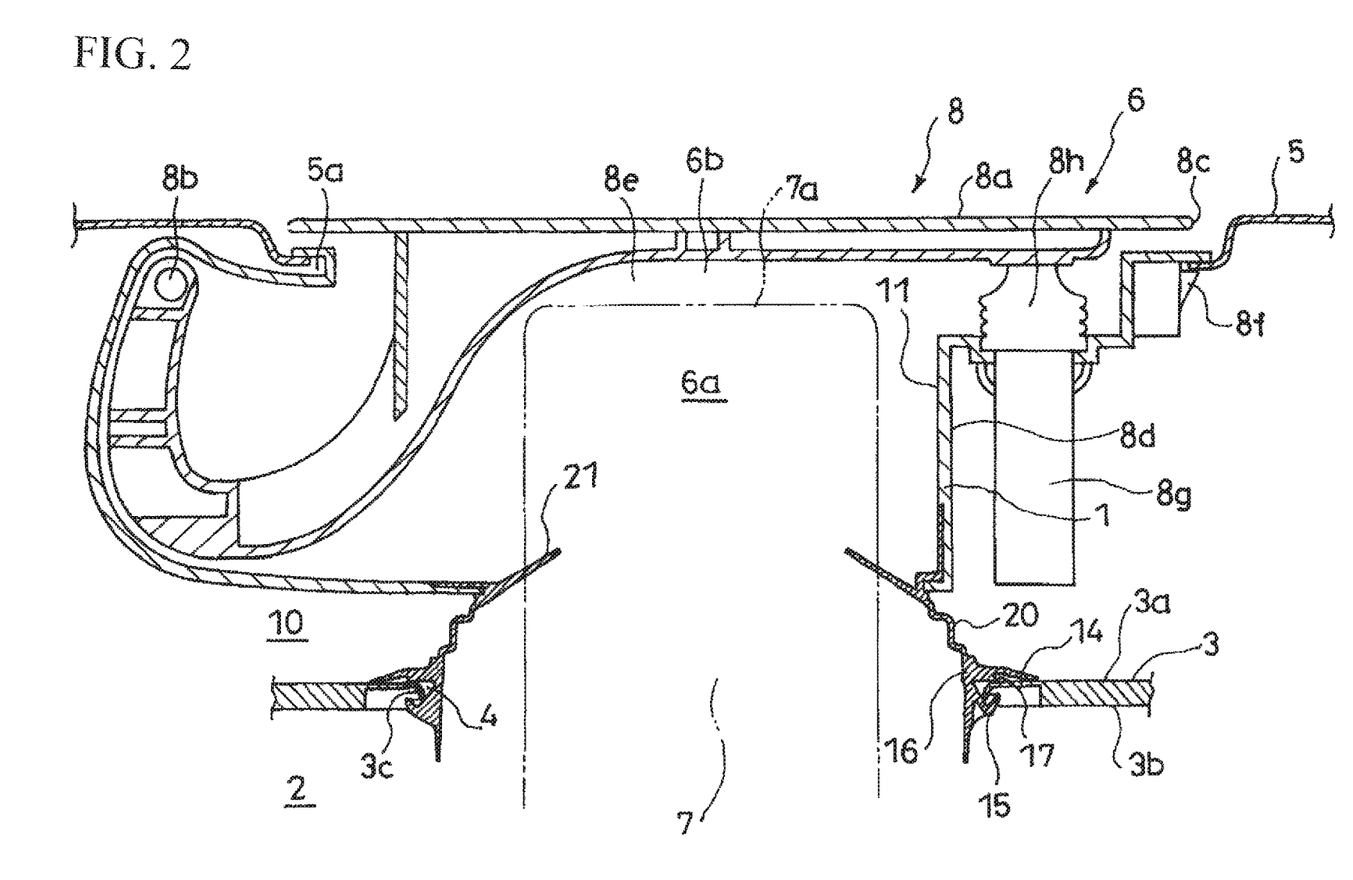
FIG. 2 is a cross-sectional structural view showing one example of a fuel supply portion forming device according to one embodiment of the present invention.
Figure 3:
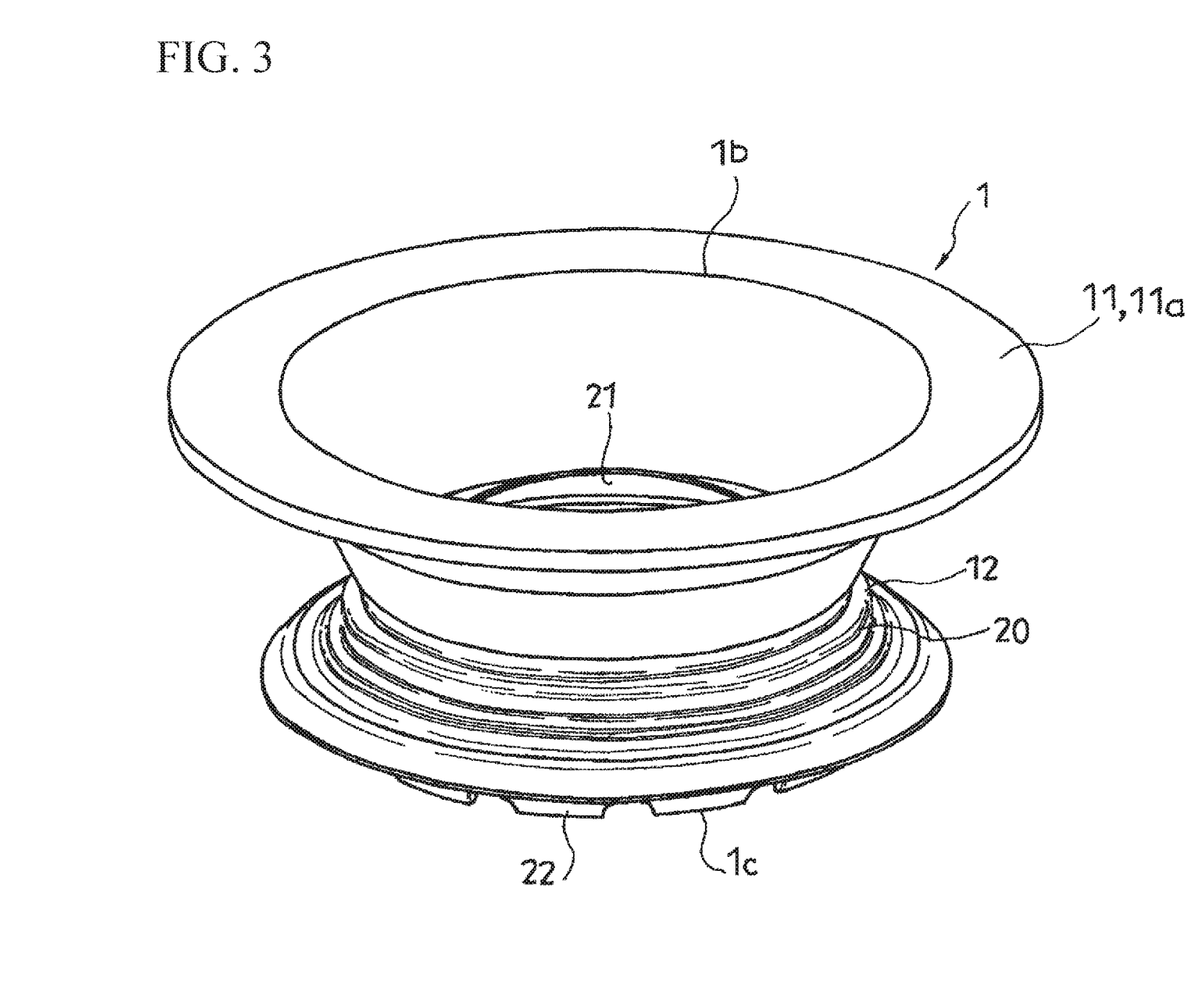
FIG. 3 is a perspective view showing one example of a sleeve member according to one embodiment of the present invention.

FIG. 1 shows one example of an installation state of the fuel supply portion 6. The reference numeral 9 in the drawing represents a fuel tank; the reference numeral 7 represents the filler pipe; the reference numeral 2 represents the wheel house; the reference numeral 6 represents the fuel supply portion; and the reference 8a represents a lid. The filler pipe 7 positions the upper end 7a (a fuel filling aperture) thereof in the fuel supply portion 6 through the through hole 4 formed in the inside panel 3 forming the wheel house 2. As shown in FIG. 2, the fuel supply portion 6 has a structure to open and close an entrance 6b of a concave portion 6a by the lid 8a, and positions the upper end 7a of the filler pipe 7 inside the concave portion 6a. The lid 8a opens so as to supply fuel by inserting a nozzle (omitted in the drawings) of a fuel feed gun into the filler pipe 7 from the upper end 7a of the filler pipe 7.

FIG. 2 shows one example of the fuel supply portion forming device 8. The reference 8d in the drawing represents a main member portion shaping the concave portion 6a forming the fuel supply portion 6, and the reference 8a in the drawing represents the lid to open and closing the entrance 6b of the concave portion 6a. In such fuel supply portion forming device 8, the main member portion 8d functions as the later-described attachment portion 11 of the filler-pipe sleeve member 1.

In an illustrated example, through an open portion 8e formed in the outside panel 5, when the sleeve member 1 is inserted into the through hole 4 of the inside panel 3 with the later-described engagement-portion 15 side of the sleeve member 1 foremost up to a position where the open portion 8e of the main member portion 8d which becomes the entrance 6b of the concave portion 6a becomes substantially a same surface as an outer face of the outside panel 5, the engagement portion 15 engages the through hole 4, and an engagement claw 8f formed on an outside of an open-portion 8e side of the main member portion 8d engages an edge portion of the open portion 8e so as to adequately form the fuel supply portion 6 on the outside panel 5. A structure of the sleeve member 1 in the fuel supply portion forming device 8 shown in FIG. 2 is substantially the same as a structure of the sleeve member 1 shown in FIG. 3 and thereafter, so that an explanation thereof is omitted.

The reference 8b in FIG. 2 represents a rotary central shaft of the lid 8a, and the reference 8g represents a lifter abutted against a back surface on a free-end 8c side of the lid 8a. In the illustrated example, when the lid 8a located in a closed position is pushed in, a movable portion 8h (having a structure covering an embedded movable member which is not shown in the drawing with a flexible jacket) of the lifter 8g is unlocked, so that the movable portion 8h moves to project so as to rise a free end 8c of the lid 8a up. Then, the lid 8a can be operated to open by placing one's finger at the free end 8c of the risen lid 8a. In a process of operating to close the open lid 8a after a fuel supply, the movable portion 8h is pushed by the lid 8a so as to return to a position before a projecting movement, and at a backward-movement position, the movable portion 8h is locked again.

The sleeve member 1 comprises an attachment portion 11 relative to the outside panel 5; a main seal portion 14 elastically deformed and pressed against an inner face 3a facing a space 10 formed between the inside panel 3 and the outside panel 5 in such a way so as to surround the through hole 4 by an insertion into the through hole 4; and the engagement portion 15 which becomes engageable with a hole edge portion of the through hole 4 positioned on an outer-face 3b side of the inside panel 3 by the insertion into the through hole 4. In the illustrated example, the inside panel 3 has a structure comprising a circumferential rising portion 3c bordering the through hole 4 on a wheel-house 2 side, and the circumferential rising portion 3c becomes the hole edge portion of the through hole 4. In case of forming a simple through hole 4 without such circumferential rising portion 3c on the inside panel 3, a portion adjacent to the through hole 4 on the outer face 3b of the inside panel 3 becomes the hole edge portion with which the engagement portion 15 engages (see FIG. 12).

In an example shown in FIG. 3 to FIG. 9, the attachment portion 11 has a structure which does not function as the main member portion 8d. The attachment portion 11 has a structure wherein a cross section orthogonal to a central axis 1a (see FIG. 7) of the sleeve member 1 has substantially a circular shape at any position, and inner and outer diameters thereof are gradually reduced downwardly. On an upper end of the attachment portion 11, there is formed an outer flange 11a, and using the outer flange 11a, the attachment portion 11 is fixed relative to the outside panel 5. In the illustrated example, the upper end 7a of the filler pipe 7 is positioned on an inside of such attachment portion 11, and an inner portion of the attachment portion 11 becomes one portion of an inner portion of the fuel supply portion 6. Typically, such attachment portion 11 is made of metal or a plastic which is difficult to be elastically deformed.

In the example shown in FIG. 3 to FIG. 9, in the sleeve member 1, portions except for the attachment portion 11 (hereinafter, the portions are called a flexible portion 12) are made of rubber, or a plastic having an elastic deformation characteristic, or a plastic having rubber-like elasticity.

Figure 7:
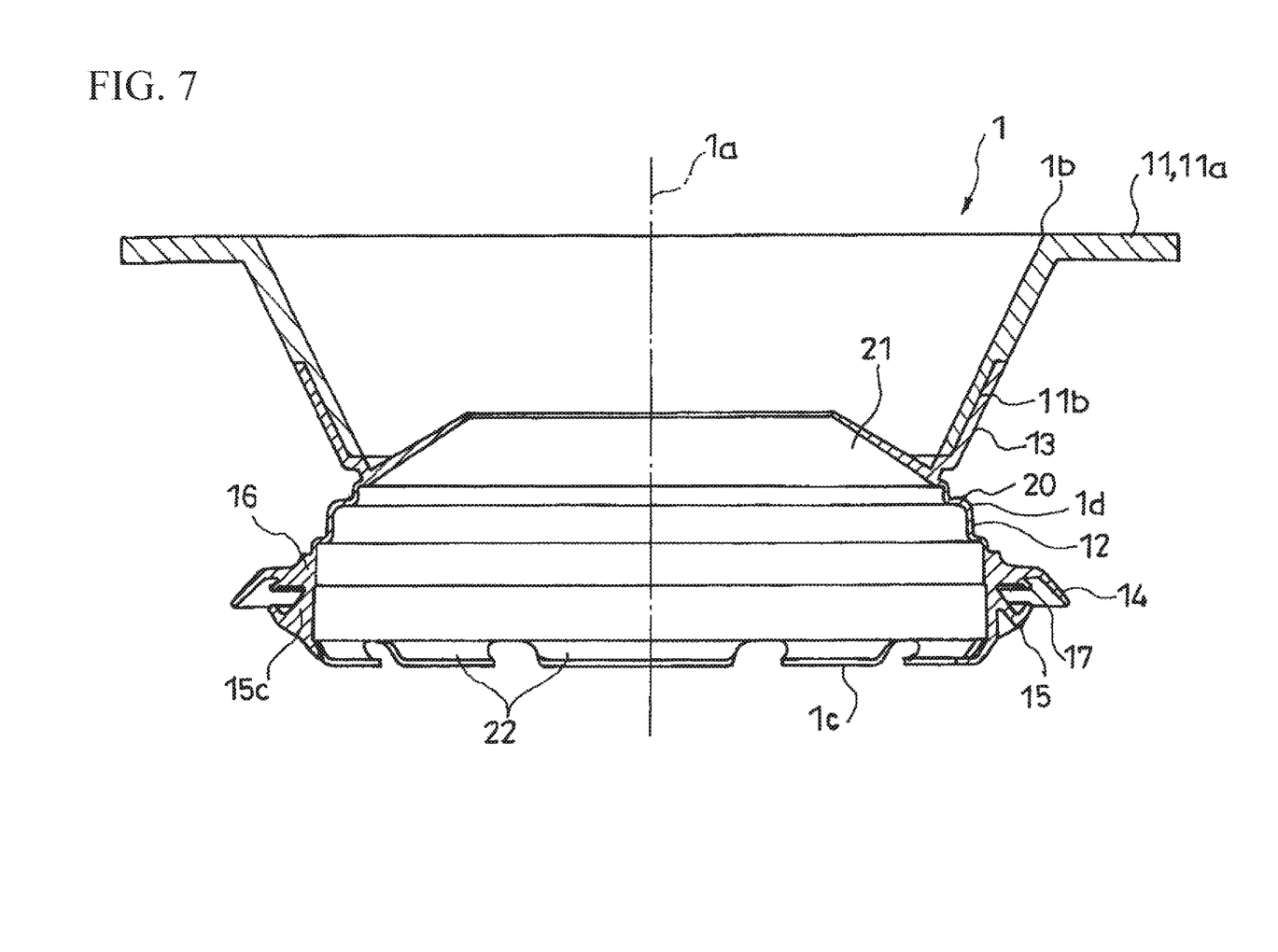
FIG. 7 is a cross-sectional view taken along line A-A in FIG. 6.

On the top in FIG. 7, the flexible portion 12 has a connecting portion 13 between the flexible portion 12 and the attachment portion 11. The connecting portion 13 is integrated with the attachment portion 11 in such a way so as to internally house a lower-portion side of the attachment portion 11. Namely, the connecting portion 13 has a shape matching the attachment portion 11. In the illustrated example, on an outside of the lower-portion side of the attachment portion 11, there is formed a circumferential concave portion 11b with a portion corresponding to a thickness of the connecting portion 13, and in a state wherein the connecting portion 13 closely contacts an inner face thereof with an outer face of the attachment portion 11 inside the circumferential concave portion 11b, and an outer face of the connecting portion 13 is positioned on the same face as an outer face of the attachment portion 11 above the circumferential concave portion 11b, the connecting portion 13 is integrated with the attachment portion 11 (see FIG. 7). The attachment portion 11 and the flexible portion 12 are formed by two-color molding of synthetic resins so as to be integrated without any difficulty. Alternatively, the attachment portion 11 and the flexible portion 12 are formed by insert molding of the synthetic resin wherein one of the attachment portion 11 and the flexible portion 12 is an insert portion so as to be integrated without any difficulty.

The main seal portion 14 forms one portion of the flexible portion 12 as well. The main seal portion 14 is formed on an outside of the sleeve member 1 on a more inner side than the connecting portion 13 (a side close to the inside panel 3), and on a more outer side than the engagement portion 15 (a side close to the outside panel 5).

In the illustrated example, the sleeve member 1 includes an outer end 1b which is the attachment-portion 11 side, and an intermediate circumferential rising portion 16 between the outer end 1b and an inner end 1c which is opposite to the outer end 1b. An outer diameter of the sleeve member 1 is larger than a hole diameter of the through hole 4 of the inside panel 3 at a position forming the intermediate circumferential rising portion 16, and the sleeve member 1 is inserted relative to the through hole 4 with a limit of a position where the intermediate circumferential rising portion 16 abuts against the inner face 3a of the inside panel 3.

The main seal portion 14 has a circumferential shape surrounding the central axis 1a, and is formed in such a way so as to extend to an outside from a projecting end of the intermediate circumferential rising portion 16. The main seal portion 14 is formed in such a way so as to approach the inner end 1c of the sleeve member 1 as projecting from the intermediate circumferential rising portion and gradually increase a distance between the main seal portion 14 and the central axis 1a, and presses a terminal 14a side thereof against the inner face 3a (see FIG. 8) of the inside panel 3. Namely, in the illustrated example, the main seal portion 14 has a skirt shape wherein a pressing side relative to the inner face 3a of the inside panel 3 is a bottom side.

Figure 5:
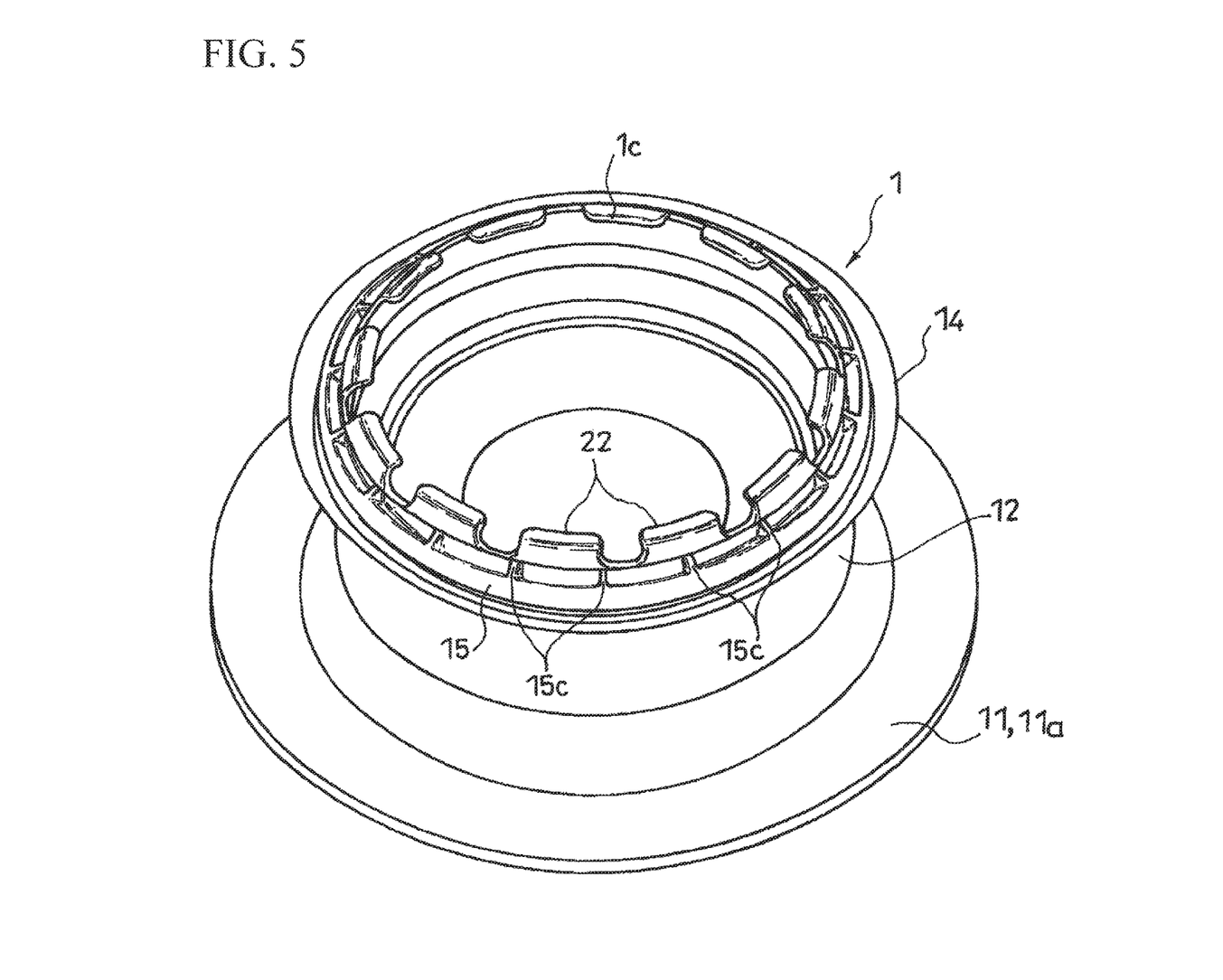
FIG. 5 is a perspective view of the sleeve member, and shows the sleeve member viewed from a lower side in FIG. 3.
Figure 6:
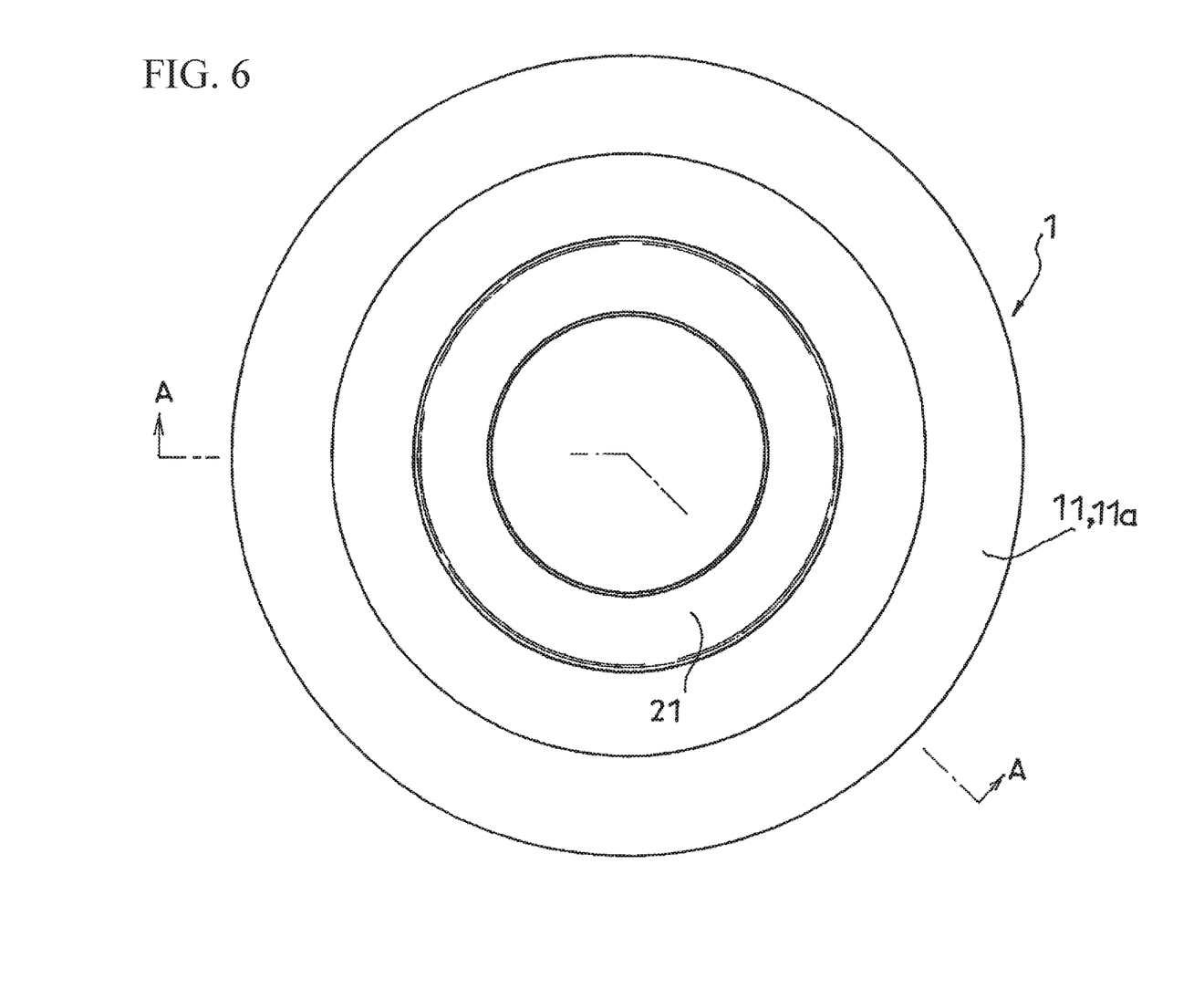
FIG. 6 is a plan view of the sleeve member.
Figure 8:
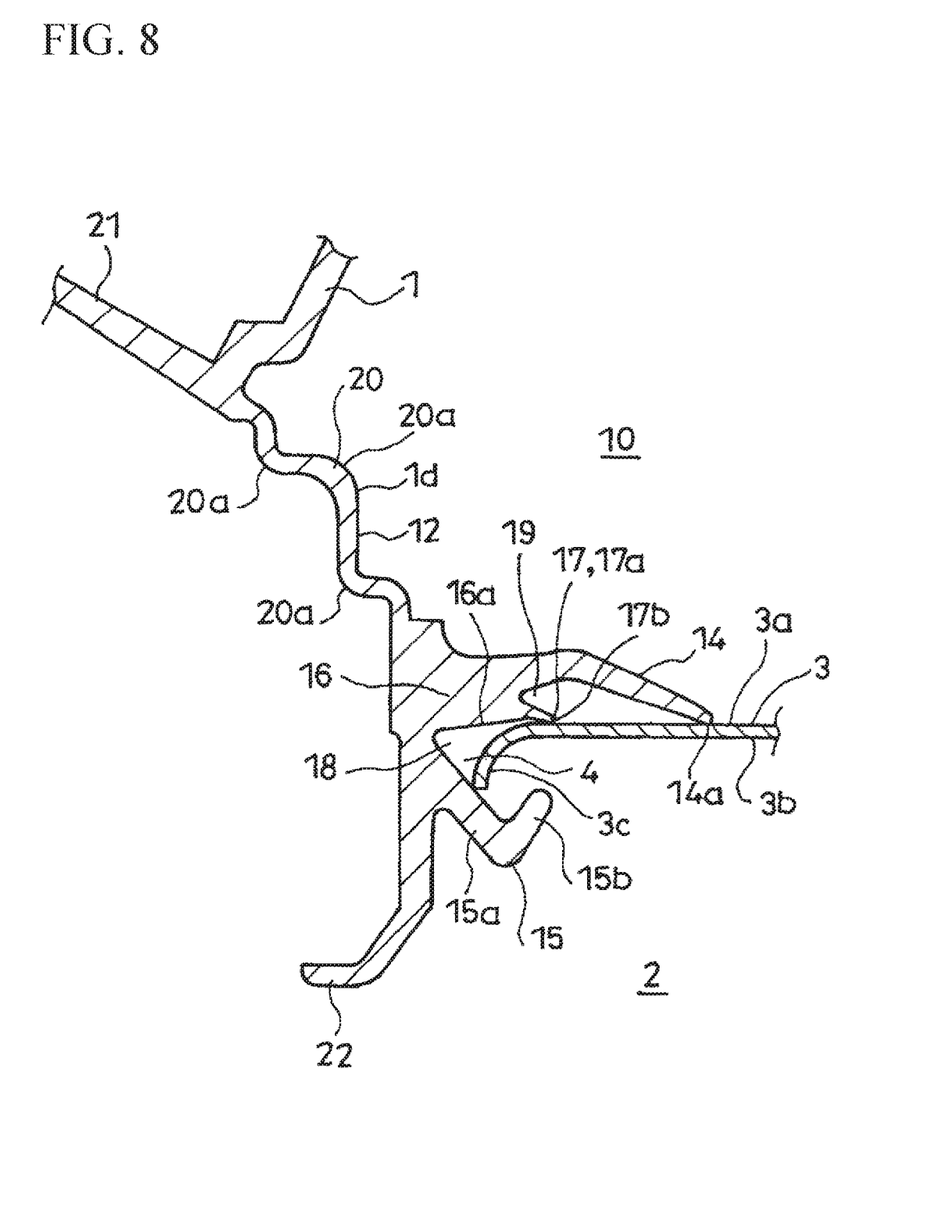
FIG. 8 is a cross-sectional structural view of essential parts showing an attachment state of the sleeve member, and shows the essential parts on a right side of the sleeve member, and a left side in the drawing is an inside of the sleeve member.

On the other hand, the engagement portion 15 forms one portion of the flexible portion 12 as well. As shown in FIG. 7, the engagement portion 15 is formed on the outside of the sleeve member 1 between the main seal portion 14 and the inner end 1c of the sleeve member 1. In the illustrated example, as shown in FIG. 8, the engagement portion 15 is formed by a base portion 15a and a circumferential claw portion 15b. The base portion 15a is formed in such a way so as to approach the inner end 1c of the sleeve member 1 as projecting from the sleeve member 1, and gradually increase a distance between the base portion 15a and the central axis 1a, and has the circumferential shape surrounding the central axis 1a. The circumferential claw portion 15b is formed in such a way so as to project toward a main-seal-portion 14 side from a lower end of the base portion 15a, and the engagement portion 15 has a bending cross-sectional shape wherein a side facing the main seal portion 14 is an inside of bending. In FIG. 5, the reference 15c in the drawing represents ribs formed in such a way so as to fill between the base portion 15a and an outer face of the sleeve member 1 on the inner-end 1c side so as to reinforce the base portion 15a on a side facing the inner end 1c of the sleeve member 1 in the engagement portion 15, and a plurality of ribs 15c is formed at intervals between adjacent ribs 15c in a direction surrounding the central axis 1a.

The outer diameter of the sleeve member 1 is slightly larger than the hole diameter of the through hole 4 of the inside panel 3 at a position forming the engagement portion 15. Therefore, the sleeve member 1 can be inserted into the through hole 4 by an elastic deformation toward the central-axis 1a direction of the engagement portion 15. When the inner-end 1c side of the sleeve member 1 is inserted into the through hole 4 up to a position where the intermediate circumferential rising portion 16 abuts against the inner face 3a of the inside panel 3, the circumferential claw portion 15b of the engagement portion 15 reaches below the outer face 3b of the inside panel 3, and the engagement portion 15 elastically returns, so that the circumferential claw portion 15b is positioned on an outer side of the hole edge portion of the through hole 4, and the base portion 15a is pressed against the through hole 4 (FIG. 8).

When the sleeve member 1 is inserted into the through hole 4, the sleeve member 1 is integrated with the inside panel 3 by the engagement portion 15, and the sleeve member 1 is integrated with the outside panel 5 by the attachment portion 11, and inside the space 10, the wheelhouse 2 side and an inside of the space 10 are sealed fluid-tightly by the main seal portion 14. Thereby, in case of carrying out high-pressure cleaning inside the wheel house 2, or even in a case wherein an external force acts on the engagement portion 15 by water splashed by a tire, and the like, cleaning water and the like cannot enter into the space 10. A tolerance of a distance between the outside panel 5 and the inside panel 3 is absorbed by the elastic deformation of the main seal portion 14.

Incidentally, in the present embodiment, the engagement portion 15 is formed by the base portion 15a having the circumferential shape, and the circumferential claw portion 15b, and when the engagement portion 15 engages relative to the inside panel 3, the engagement portion 15 is elastically deformed and pressed against the hole edge portion of the through hole 4 in such a way so as to surround the through hole 4. Thereby, in the present embodiment, an engagement portion between the hole edge portion of the through hole 4 and the engagement portion 15 functions as a sub-seal portion assisting the main seal portion 14. Namely, the engagement portion 15 has a sealing function as well, and reduces strength of the cleaning water of the high-pressure cleaning and the like at the engagement portion 15 so as not to affect the main seal portion 14.

Also, as shown in FIG. 8, the sleeve member 1 comprises a stopper portion 17 forming one portion of the flexible portion 12. Such stopper portion 17 is located at a portion adjacent to the main seal portion 14, and abuts against the inner face 3a of the inside panel 3 so as to suppress the elastic deformation exceeding a predetermined deformation amount of the main seal portion 14.

In the illustrated example, as mentioned above, the sleeve member 1 is inserted relative to the through hole 4 with the limit of the position where the intermediate circumferential rising portion 16 abuts against the inner face 3a of the inside panel 3, and a portion facing the inner-end 1c side of the sleeve member 1 in the intermediate circumferential rising portion 16 functions as the stopper portion 17.

Without the stopper portion 17, as the distance between the outside panel 5 and the inside panel 3 becomes closer, an elastic deformation amount of the main seal portion 14 becomes larger. However, by providing the stopper portion 17, the elastic deformation amount can be suppressed to the predetermined deformation amount or less. Thereby, an area where the main seal portion 14 is pressed against the inner face 3a of the inside panel 3 can be set so as not to enlarge unnecessarily, and a reduction of a pressing pressure per unit area of a pressing portion can be prevented so as to adequately maintain the sealing function of the main seal portion 14.

In the embodiment, the stopper portion 17 is positioned on the through-hole 4 side more than the main seal portion 14.

Also, in the stopper portion 17, there is formed a lip portion 17a elastically deformed and pressed against the inner face 3a of the inside panel 3 in such a way so as to surround the through hole 4.

The lip portion 17a has a circumferential flange shape extending to the outside from the projecting end of the intermediate circumferential rising portion 16 at a portion located between the main seal portion 14 and the engagement portion 15. A terminal of the lip portion 17a is positioned on the inner-end 1c side more than a face facing the inner end 1c of the sleeve member 1 of the intermediate circumferential rising portion 16, and is positioned on the through-hole 4 side more than the terminal of the main seal portion 14.

Thereby, in the present embodiment, inside the space 10, the wheel-house 2 side and the inside of the space 10 are sealed fluid-tightly at two different portions of the lip portion 17a and the main seal portion 14, respectively.

Especially, in the illustrated example, there is formed a first circumferential gap 18 between the engagement portion 15 and the lip portion 17a, and there is formed a second circumferential gap 19 between the lip portion 17a and the main seal portion 14 (see FIG. 8). Thereby, an entry of liquid into the space 10 by a capillary phenomenon can be reliably prevented as well.

Incidentally, the stopper portion 17 may abut against the inner face 3a of the inside panel 3 for the first time in a case wherein the main seal portion 14 carries out the elastic deformation exceeding the predetermined deformation amount.

Also, the sleeve member 1 comprises an elastically deformable portion 20 forming one portion of the flexible portion 12. Such elastically deformable portion 20 is located between the attachment portion 11 and the main seal portion 14, and is elastically deformed according to the distance between the outside panel 5 and the inside panel 3, and a thickness of the sleeve member 1 for allowing the tolerance of the distance between the outside panel 5 and the inside panel 3 to be unaffected on the main seal portion 14 as little as possible is formed thinnest at the elastically deformable portion 20.

Figure 9:
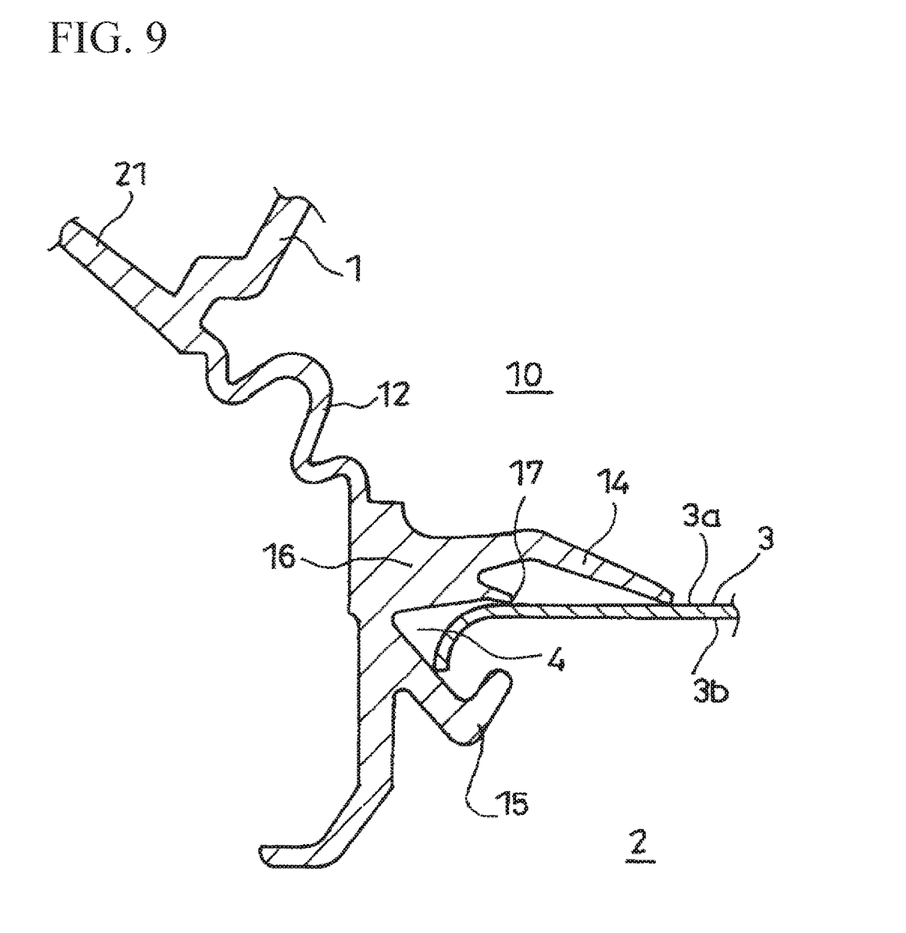
FIG. 9 is a cross-sectional structural view of the essential parts showing the attachment state of the sleeve member, and shows the essential parts on the right side of the sleeve member, and a left side in the drawing is the inside of the sleeve member, and shows a condition when an elastically deformable portion is elastically deformed.

In the illustrated example, the elastically deformable portion 20 is formed by forming three circumferential bending portions 20a at intervals between adjacent circumferential bending portions 20a in the central-axis 1a direction in a trunk portion 1d of the sleeve member 1 located between the connecting portion 13 and the intermediate circumferential rising portion 16. Among the three circumferential bending portions 20a, the middle circumferential bending portion 20a forms an inferior angle on an inside of the sleeve member 1 in which the inside of the sleeve member 1 is an inside of bending, and the circumferential bending portions 20a on an upper side and a lower side sandwiching the middle circumferential bending portion 20a form inferior angles on the outside of the sleeve member 1 in which the outside of the sleeve member 1 is the inside of bending (FIG. 8). When the distance between the outside panel 5 and the inside panel 3 becomes smaller than a standard value, the elastically deformable portion 20 is elastically deformed in such a way so as to reduce an angle on the inside of bending thereof at the respective three circumferential bending portions 20a (FIG. 9).

Figure 4:
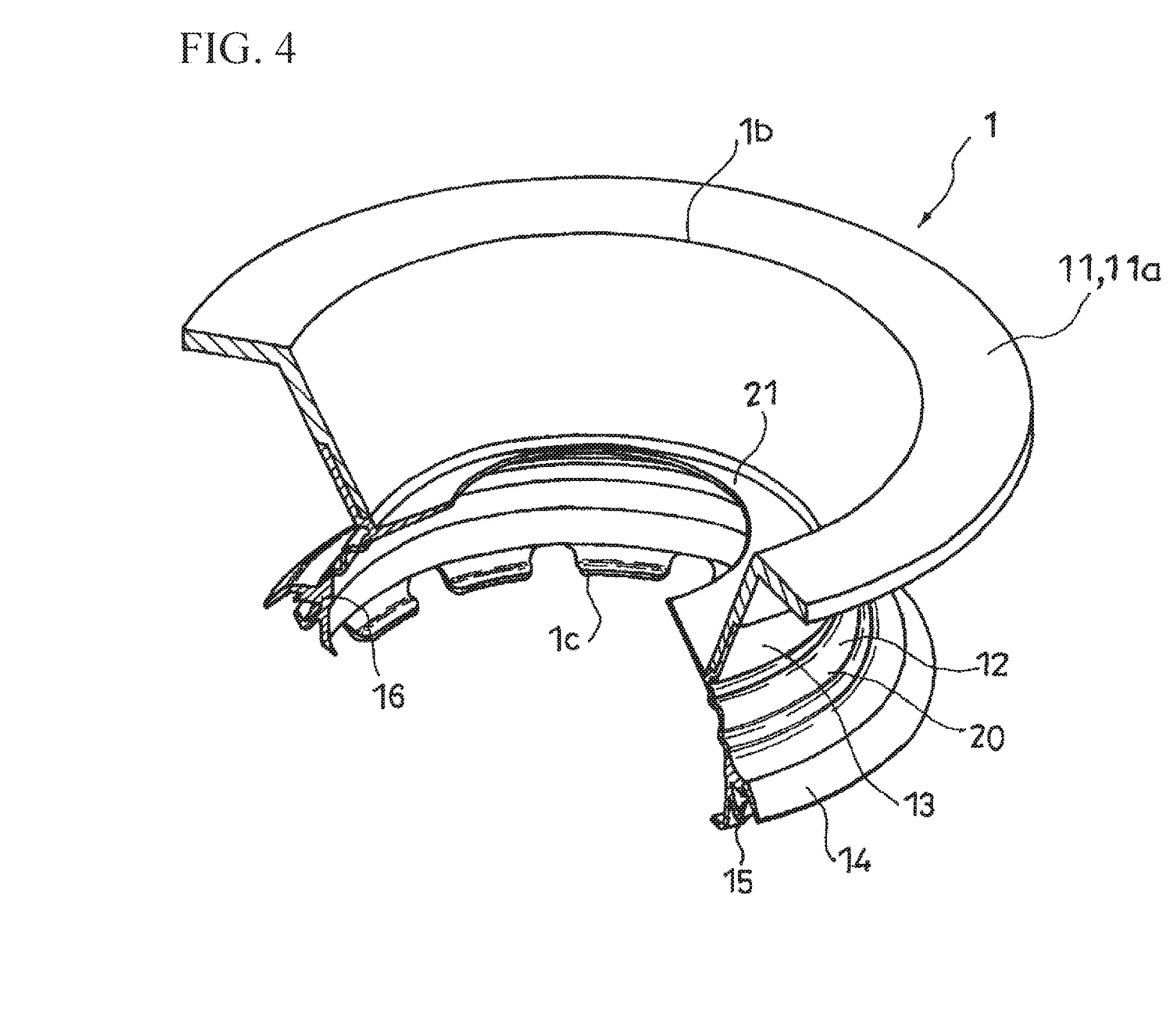
FIG. 4 is a partially cut perspective view of essential parts of the sleeve member.

Also, as shown in FIG. 4, the sleeve member 1 comprises a cover portion 21 forming one portion of the flexible portion 12. Such cover portion 21 is formed in such a way so as to project to the filler-pipe 7 side on the inside of the sleeve member 1. In the illustrated example, such cover portion 21 is formed at a portion located between the main seal portion 14 and the attachment portion 11.

In the illustrated example, as shown in FIG. 7, such cover portion 21 has a short tapered cylindrical shape formed in such a way so as to gradually reduce both inner and outer diameters as approaching an outer-end 1b side of the sleeve member 1. A lower end of the cover portion 21 is integrated with a linked portion between the connecting portion and the trunk portion 1d. An upper end of the cover portion 21 is positioned on an inner side of the attachment portion 11, and an inner diameter of the upper end of the cover portion 21 is slightly smaller than an outer diameter of the filler pipe 7, and in the illustrated example, in a state wherein the cover portion 21 is elastically deformed, the filler pipe 7 passes the sleeve member 1, and the upper end thereof is positioned in the fuel supply portion 6. Such cover portion 21 closes between the sleeve member 1 and the filler pipe 7 passing the inside of the sleeve member 1 without any difficulty.

Incidentally, in the illustrated example, in the inner end 1c of the sleeve member 1, there is formed a plurality of holding pieces 22 with a gap between adjacent holding pieces 22 in the direction surrounding the central axis 1a, and when the sleeve member 1 is inserted into the through hole 4 of the inside panel 3 using the holding pieces 22, the sleeve member 1 can be operated to be pulled from the wheel-house 2 side.

Figure 10:
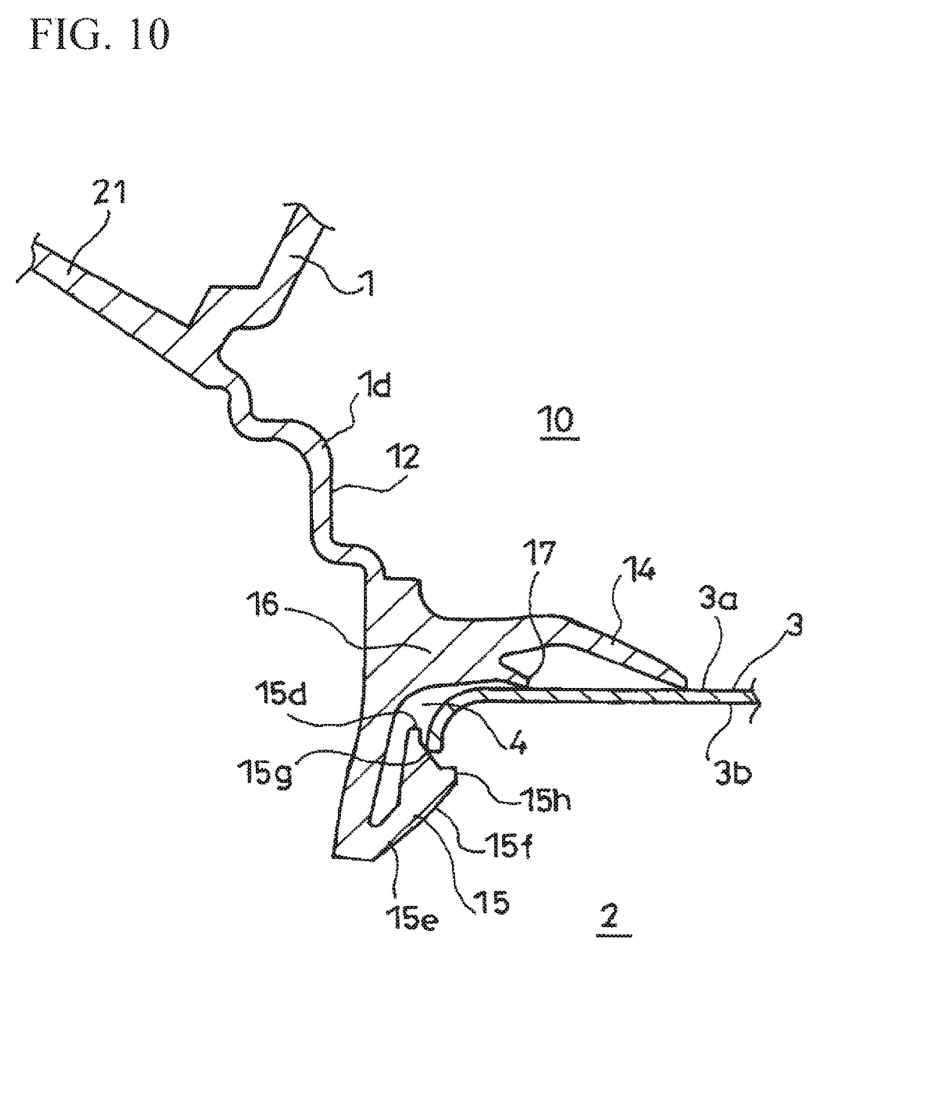
FIG. 10 is a cross-sectional structural view of the essential parts showing another example of the sleeve member wherein a structure of an engagement portion of the sleeve member is modified.

FIG. 10 shows a modified example of a shape of the engagement portion 15 in a structural example shown in FIG. 3 to FIG. 9. In the modified example, the engagement portion 15 is formed by a short cylindrical member formed in such a way so as to surround the inner end 1c of the sleeve member 1 on the outside of the sleeve member 1. A cylinder lower end 15e of the engagement portion 15 is integrated with an inner-end 1c side of the sleeve member 1, and a cylinder upper end 15d of the engagement portion 15 is positioned at an interval between the cylinder upper end 15d and the intermediate circumferential rising portion 16. An outer-face side of the engagement portion 15 becomes a first inclined face 15f gradually increasing a distance between the first inclined face 15f and the central axis 1a as moving toward a cylinder-upper-end 15d side from the cylinder lower end 15e thereof. In the cylinder upper end 15d of the engagement portion 15, there is formed a second inclined face 15g in a direction reverse to the first inclined face 15f. A top portion 15h is formed between the first inclined face 15f and the second inclined face 15g. In the modified example, when the sleeve member 1 is inserted into the through hole 4, the first inclined face 15f contacts the hole edge portion of the through hole 4, and the engagement portion 15 bends inwardly, and when the engagement portion 15 elastically returns at a position where the insertion ends, the second inclined face 15g is pressed against the hole edge portion of the through hole 4 over an entire circumference of the through hole 4. In the example shown in FIG. 10, regarding portions substantially the same as those in the structural example shown in FIG. 3 to FIG. 9, an explanation thereof is omitted.

Figure 11:
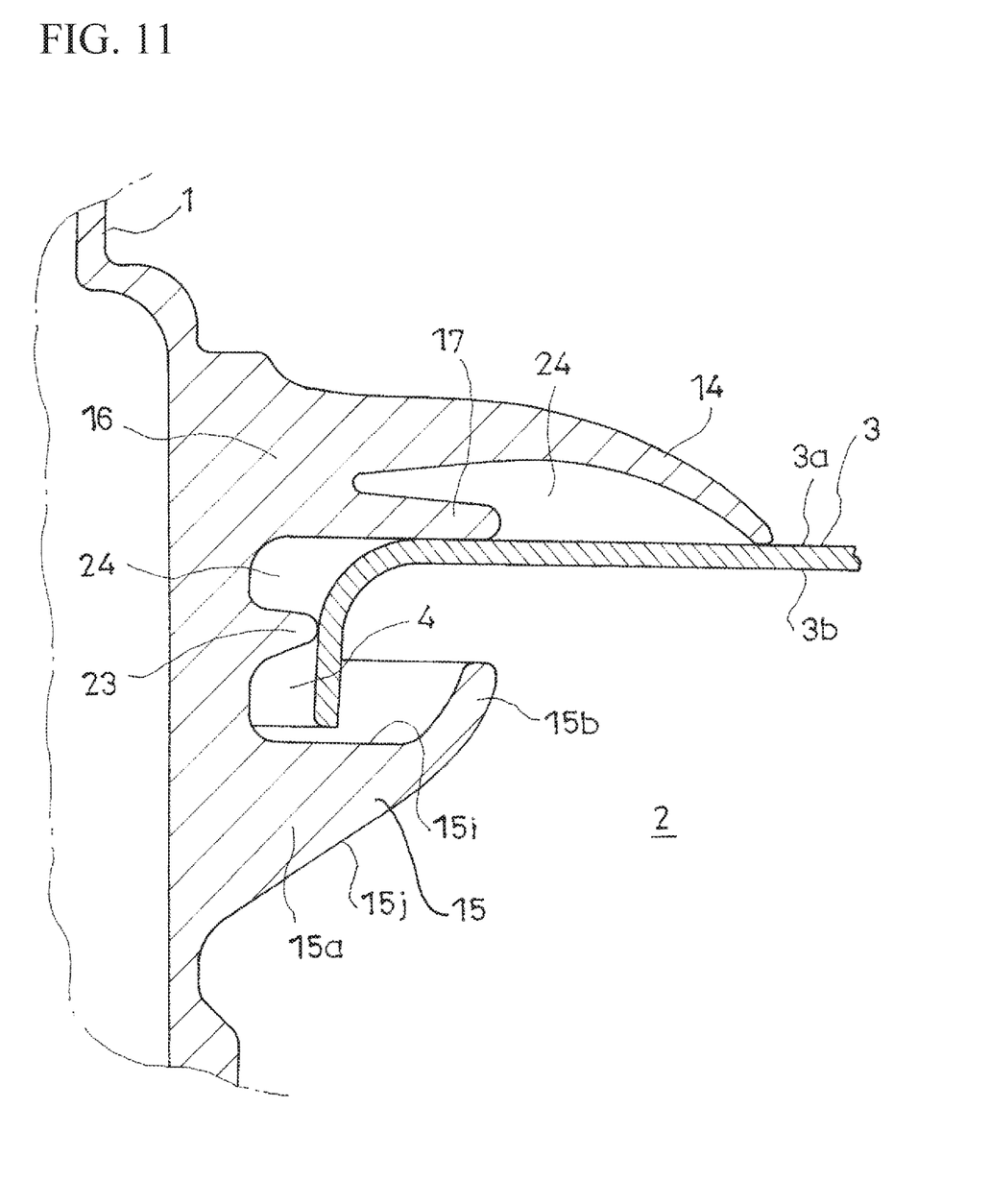
FIG. 11 is a cross-sectional structural view of the essential parts showing another example of the sleeve member wherein a structure of the engagement portion of the sleeve member or the like is modified.

FIG. 11 shows a modified example wherein the shape of the engagement portion 15 in the structural example shown in FIG. 3 to FIG. 9 is modified, and a circumferential projecting portion 23 is formed between the main seal portion 14 and the engagement portion 15.

In the example shown in FIG. 11 as well, the engagement portion 15 is formed by the base portion 15a and the circumferential claw portion 15b. The base portion 15a is formed as an enlarged portion having the circumferential shape formed on the outside of the sleeve member 1. In the base portion 15a, the main-seal-portion 14 side is an upper face 15i substantially orthogonal to the central axis 1a, and a lower face 15j on a side opposite to the upper face 15i is an inclined face gradually reducing a thickness of the base portion 15a as approaching a projecting end of the base portion 15a.

The circumferential claw portion 15b is formed in such a way so as to project toward the main-seal-portion 14 side from the projecting end of the base portion 15a. The circumferential claw portion 15b is formed in such a way so as to gradually increase a distance between the circumferential claw portion 15b and the central axis 1a as approaching the projecting end thereof. Also, an outer face of the circumferential claw portion 15b becomes a face continuing to the lower face 15j of the base portion 15a.

In the example shown in FIG. 11 as well, the outer diameter of the sleeve member 1 is slightly larger than the hole diameter of the through hole 4 of the inside panel 3 at the position forming the engagement portion 15. Therefore, the sleeve member 1 can be inserted into the through hole 4 by the elastic deformation toward the central-axis 1a direction of the engagement portion 15. An inclination of the lower face 15j of the base portion 15a allows the elastic deformation to be easily carried out when the sleeve member 1 is inserted into the through hole 4. When the inner-end 1c side of the sleeve member 1 is inserted into the through hole 4 up to the position where the intermediate circumferential rising portion 16 abuts against the inner face 3a of the inside panel 3, the circumferential claw portion 15b of the engagement portion 15 reaches below the outer face 3b of the inside panel 3, and the engagement portion 15 elastically returns, so that the base portion 15a and the circumferential claw portion 15b are positioned on an outer side of the through hole 4.

In the example shown in FIG. 11 as well, at a time of engagement relative to the inside panel 3, the engagement portion 15 functions as the sub-seal portion assisting the main seal portion 14. Namely, although the engagement portion 15 does not contact the hole edge portion of the through hole 4, the engagement portion 15 surrounds the hole edge portion of the through hole 4, and reduces the strength of the cleaning water of the high-pressure cleaning and the like at the engagement portion 15 so as not to affect the main seal portion 14.

Also, in the example shown in FIG. 11, the circumferential projecting portion 23 is formed on the outside of the sleeve member 1 between the main seal portion 14 and the engagement portion 15. The outer diameter of the sleeve member 1 at a position forming the circumferential projecting portion 23 becomes substantially equal to the hole diameter of the through hole 4. When the sleeve member 1 is inserted into the through hole 4 by the circumferential projecting portion 23, centering of the sleeve member 1 can be carried out such that the main seal portion 14 is pressed against the inner face 3a of the inside panel 3 at a predetermined position surrounding the through hole 4. Also, a sleeve-member 1 side is pressed against the inside panel 3 at three portions of the circumferential projecting portion 23, the stopper portion 17, and the main seal portion 14, and two circumferential gaps 24 are formed therebetween so as to strengthen a sealing property of a circumference of the filler pipe 7 further.

In the example shown in FIG. 11, regarding portions substantially the same as those in the structural example shown in FIG. 3 to FIG. 9, an explanation thereof is omitted.

Figure 12:
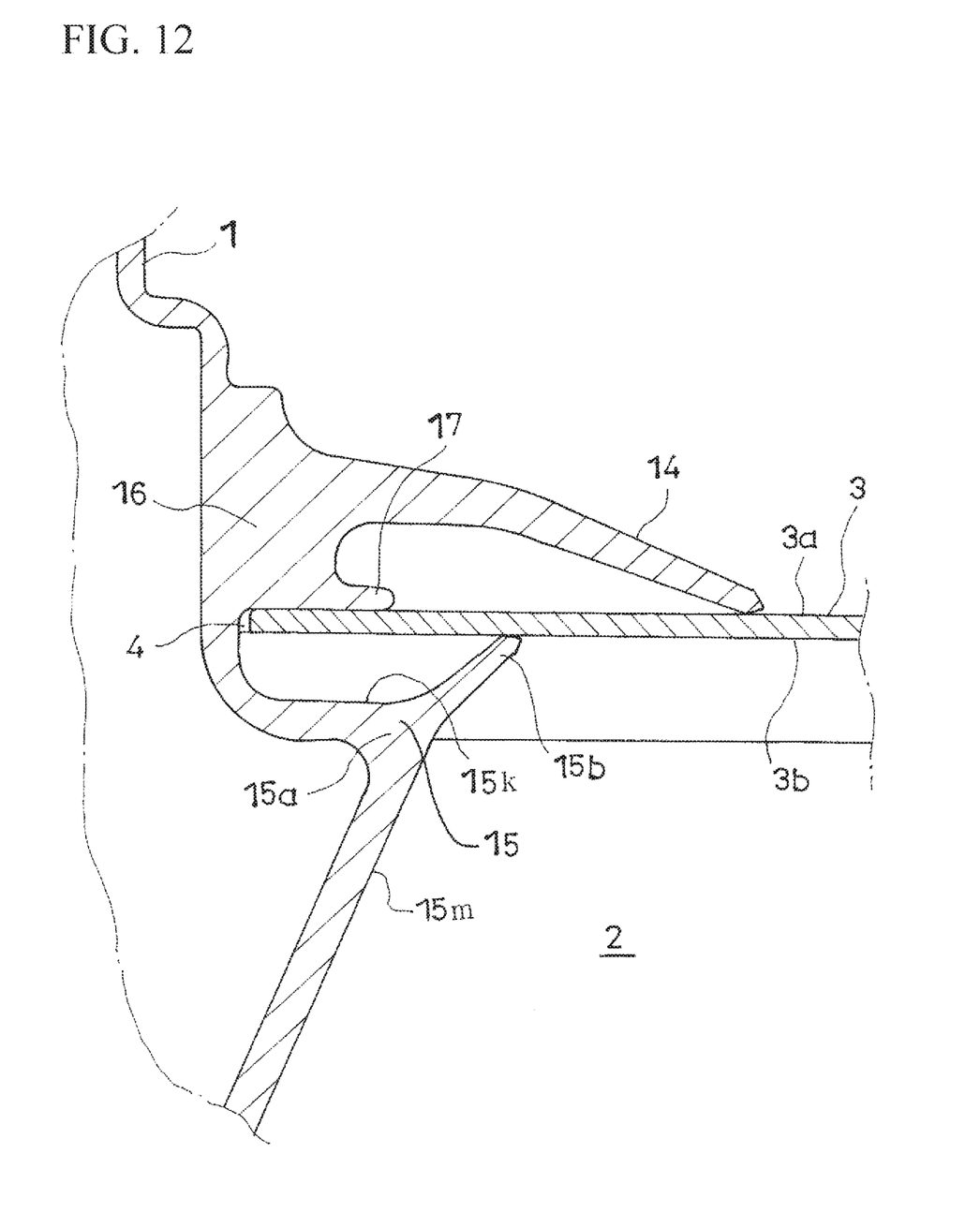
FIG. 12 is a cross-sectional structural view of the essential parts showing another example of the sleeve member wherein the structure of the engagement portion of the sleeve member or the like is modified.

FIG. 12 shows a modified example wherein the shape of the engagement portion 15 in the structural example shown in FIG. 3 to FIG. 9 is modified.

In the example shown in FIG. 12 as well, the engagement portion 15 is formed by the base portion 15a and the circumferential claw portion 15b. The base portion 15a is formed as the enlarged portion having the circumferential shape formed on the outside of the sleeve member 1. In the base portion 15a, the main-seal-portion 14 side is an upper face 15k substantially orthogonal to the central axis 1a, and a lower face 15m on a side opposite to the upper face 15k is an inclined face gradually reducing the thickness of the base portion 15a as approaching the projecting end of the base portion 15a.

The circumferential claw portion 15b is formed in such a way so as to project toward the main-seal-portion 14 side from the projecting end of the base portion 15a. The circumferential claw portion 15b is formed in such a way so as to gradually increase the distance between the circumferential claw portion 15b and the central axis 1a as approaching the projecting end thereof. Also, the outer face of the circumferential claw portion 15b becomes a face continuing to the lower face 15m of the base portion 15a.

In the example shown in FIG. 12 as well, the outer diameter of the sleeve member 1 is slightly larger than the hole diameter of the through hole 4 of the inside panel 3 at the position forming the engagement portion 15. Therefore, the sleeve member 1 can be inserted into the through hole 4 by the elastic deformation toward the central-axis 1a direction of the engagement portion 15. An inclination of the lower face 15m of the base portion 15a allows the elastic deformation to be easily carried out when the sleeve member 1 is inserted into the through hole 4. When the inner-end 1c side of the sleeve member 1 is inserted into the through hole 4 up to the position where the intermediate circumferential rising portion 16 abuts against the inner face 3a of the inside panel 3, the circumferential claw portion 15b of the engagement portion 15 reaches below the outer face 3b of the inside panel 3, and the engagement portion 15 elastically returns, so that the base portion 15a and the circumferential claw portion 15b are positioned on an outer side of the through hole 4, and the engagement portion 15 is pressed against the hole edge portion of the through hole 4.

In the example shown in FIG. 12 as well, at the time of engagement relative to the inside panel 3, the engagement portion 15 functions as the sub-seal portion assisting the main seal portion 14. Namely, the engagement portion 15 has the sealing function as well, and reduces the strength of the cleaning water of the high-pressure cleaning and the like at the engagement portion 15 so as not to affect the main seal portion 14. Although the engagement portion 15 contacts the hole edge portion of the through hole 4, the engagement portion 15 does not have to contact the hole edge portion of the through hole 4 provided that the hole edge portion of the through hole 4 is surrounded, and the strength of the cleaning water of the high-pressure cleaning and the like is reduced at the engagement portion 15 so as not to affect the main seal portion 14.

In the example shown in FIG. 12, regarding portions substantially the same as those in the structural example shown in FIG. 3 to FIG. 9, an explanation thereof is omitted.

Incidentally, obviously, the present invention is not limited to the embodiments explained in the above, and includes all embodiments which can obtain the object of the present invention.

EXPLANATION OF SYMBOLS 1 a sleeve member
2 a wheel house
3 an inside panel
3a an inner face
3b an outer face
4 a through hole
5 an outside panel
6 a fuel supply portion
7 a filler pipe
10 a space
11 an attachment portion
14 a main seal portion
15 an engagement portion Incidentally, all contents of the specification, claims, drawings, and abstract of Japanese Patent Applications No. 2017-025736 filed on Feb. 15, 2017 are cited in their entireties herein and are incorporated as a disclosure of the specification of the present invention.

What is claimed is:

1. A sleeve member for a filler pipe of an automobile, comprising:
    an attachment portion relative to an outside panel of the automobile;
    a main seal portion configured to be elastically deformed and pressed against an inner face facing a space formed between an inside panel of the automobile and the outside panel so as to surround a through hole formed in the inside panel;
    an engagement portion configured to engage with a hole edge portion of the through hole positioned on an outer-face side of the inside panel by the insertion into the through hole; and
    a stopper portion provided in a portion adjacent to the main seal portion, wherein the stopper portion is configured to abut against the inner face of the inside panel, and suppress an elastic deformation exceeding a predetermined deformation amount of the main seal portion.

2. A sleeve member for a filler pipe according to claim 1, further comprising an elastically deformable portion formed between the attachment portion and the main seal portion.

3. A sleeve member for a filler pipe according to claim 1, further comprising a cover portion projecting to a filler-pipe side provided on an inside of the sleeve member.

4. A sleeve member for a filler pipe according to claim 3, wherein the cover portion is formed at a portion located between the main seal portion and the attachment portion.

5. A sleeve member for a filler pipe according to claim 1, wherein the engagement portion is elastically deformed and pressed against the hole edge portion of the through hole in such a way so as to surround the through hole.

6. A sleeve member for a filler pipe according to claim 1, wherein the main seal portion has a skirt shape wherein a pressing side relative to the inner face of the inside panel is a bottom side.

7. A sleeve member for a filler pipe according to claim 1, wherein the stopper portion includes a lip portion elastically deformed and pressed against the inner face of the inside panel in such a way so as to surround the through hole.

8. A sleeve member for a filler pipe according to claim 1, wherein the stopper portion is positioned on a through-hole side more than the main seal portion.

9. A fuel supply portion forming device, comprising:
    a main member portion having a concave portion forming the fuel supply portion; and
    a lid opening and closing an entrance of the concave portion,
    wherein the main member portion includes the sleeve member for the filler pipe according to claim 1.

* * * * *